United States Patent Office 3,500,883
Patented Mar. 17, 1970

3,500,883
BRANCH REMOVING MACHINES
Kjell Olof Gunnar Herolf, Stig Arthur Johnsson, and Per-Gustaf Mellgren, Sundsbruk, Sweden, assignors, by mesne assignments, to Kockum Soderhamn Aktiebolag, Soderham, Sweden, a corporation of Sweden
Continuation-in-part of application Ser. No. 383,306, July 17, 1964. This application June 1, 1967, Ser. No. 642,743
Claims priority, application Sweden, July 18, 1963, 7,989/63
Int. Cl. B27m 1/00
U.S. Cl. 144—2
4 Claims

ABSTRACT OF THE DISCLOSURE

A branch removing machine comprising a frame, substantially cylindrical branch removing tools journalling in bearing housings supported from the frame in such a manner that the tools are movable towards and away from the tree trunk and means for rotating said tools, the working depth of each tool being controlled by a feeler supported from the appertaining bearing housing and comprising an edge portion extending parallel with the axis of rotation of said tool and adapted to feel the position of the envelope surface of the trunk, the distance between said edge portion and a first plane containing the axis of rotation of the tool and perpendicular to a second plane parallel with said axis and extending in the longitudinal direction of the trunk being considerably less than the radius of the envelope of said tool.

---

This application is a continuation-in-part of our application Ser. No. 383,306 filed July 17, 1964, and now Patent No. 3,326,251.

The present invention relates to improvements in branch removing machines, comprising a holder which is mounted on a frame or the like, said holder being provided with a central opening and said holder carrying at least three branch removing tools.

A very serious problem in connection with all branch removing machines is that of being able to arrange the feeding of long and heavy trees to the branch removing tools. In barking machines said problem is solved by providing feed rolls or the like before the barking tools, but in connection with branch removing machines no feed rolls can be provided before the branch removing tools, because the feeding would then very soon be rendered impossible by the branches of the trees. In barking machines the trees pass through the machine even if the barking tools should leave some areas unbarked, but in branch removing machines the tree would immediately get stuck in the machine in case the branch removing tools should leave any essential branches on the tree. The present invention has for its object the elimination of this drawback. This is achieved by mounting the tools movably in such a manner on that side of the holder which is turned towards the direction of feed of the tree that those lines of the contours of the tools that confine the opening through which the tree is to pass, at every moment during the treatment operation of the tree form both a closed polygon in a plane perpendicular to the direction of feed and an angle with a line, which is parallel with the direction of feed of the tree.

The invention is illustrated in the accompanying drawings.

Figure 1:
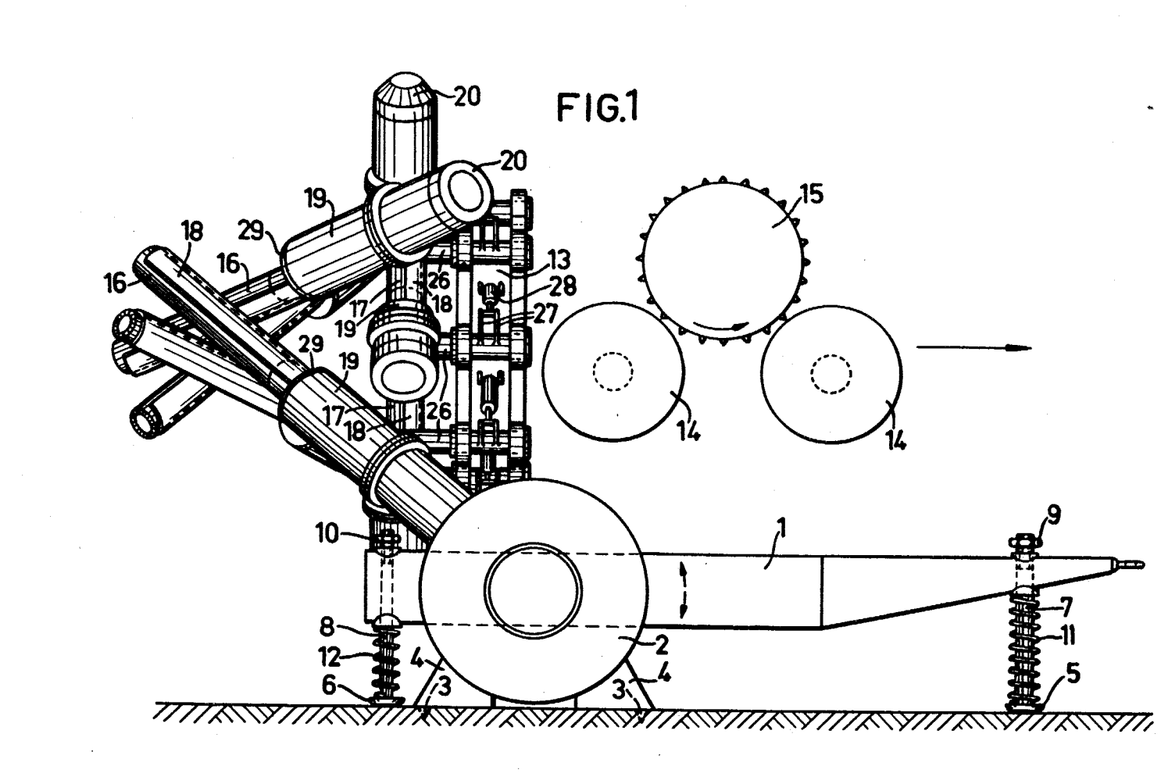
FIG. 1 is a side elevational view of the branch removing machine.

The branch removing machine according to FIG. 1 is mounted on a frame 1, supported by wheels 2. When the machine is in operation the wheels are to be locked by means of stopping members 4, which are provided with spikes 3. At both ends the frame 1 is provided with supporting members 5, 6, secured to threaded uprights 7, 8, each of which extends through a non-threaded hole in the frame and each of which is provided with a nut, 9 and 10, respectively. Between the lower portion of the frame and each supporting member 5, 6 there is provided a spring, 11 and 12, respectively. Hereby the frame 1 is able to swing around the axle of the wheels 2, by which it can smoothly take up and moderate the oscillatory movements to which the frame 1 is subject because of the feeding of the trees. If the branch removing machine is to be moved, the supporting members 5, 6 are pulled upwards by turning the nuts 9, 10. On the frame 1 there is mounted a holder 13, which is provided with a circular opening for the trees, said holder 13, on the feeding-in side of the machine, carrying a number of branch removing tools. On the feeding-out side of the frame 1 there are, furthermore, provided manually, or automatically, closing feed rolls 14, 15 of a kind known per se. In case the holder 13 is stationarily mounted on the frame 1 the feed rolls should be of the type automatically centering the tree. If the holder 13 is movably mounted on the frame 1, the feed rolls 14 may be stationarily mounted on the frame and the roll 15 may be adapted to be raised and lowered, as shown in FIG. 1. In that case the roll 15 preferably is provided at the free end of a swingable arm (not shown), which by means of a link member is connected with a swingable holder 13 in such a manner that the latter will be centered with respect to the tree.

Figure 2:
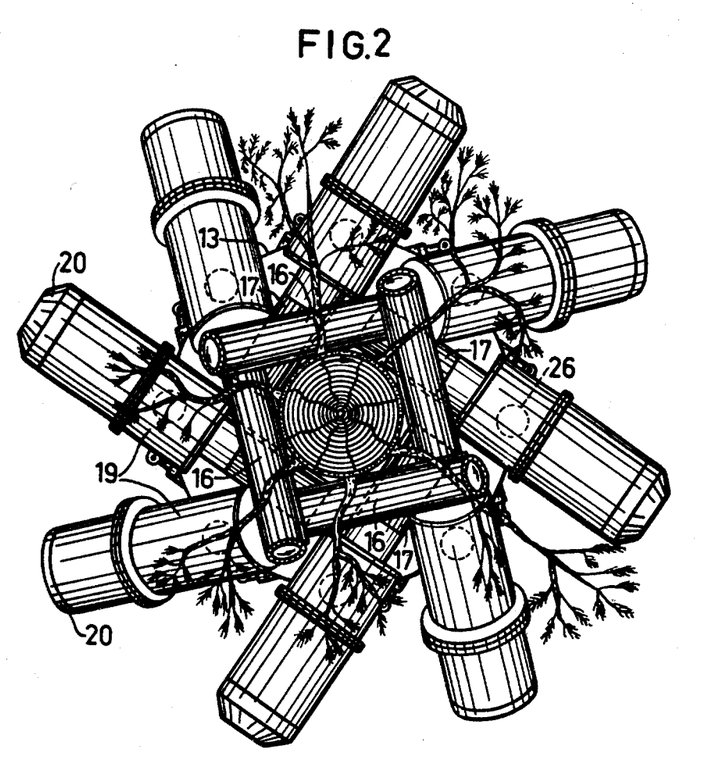
FIG. 2 is a front elevational view of the machine when in operation.
Figure 3:
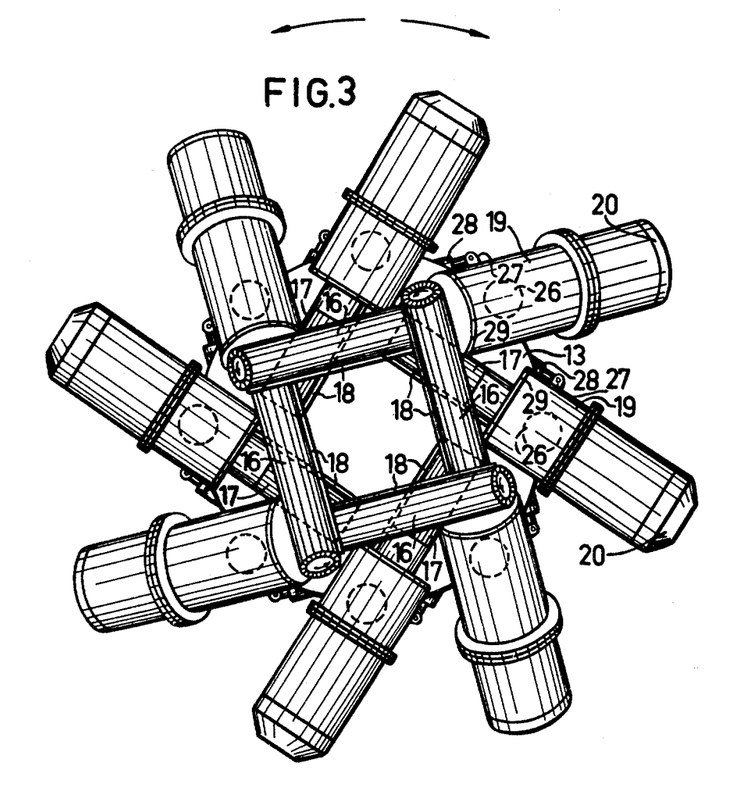
FIGS. 3 and 4 are front elevational views of the machine, showing the branch removing tools when in an almost maximally open position and, respectively, when in the closed position.
Figure 4:
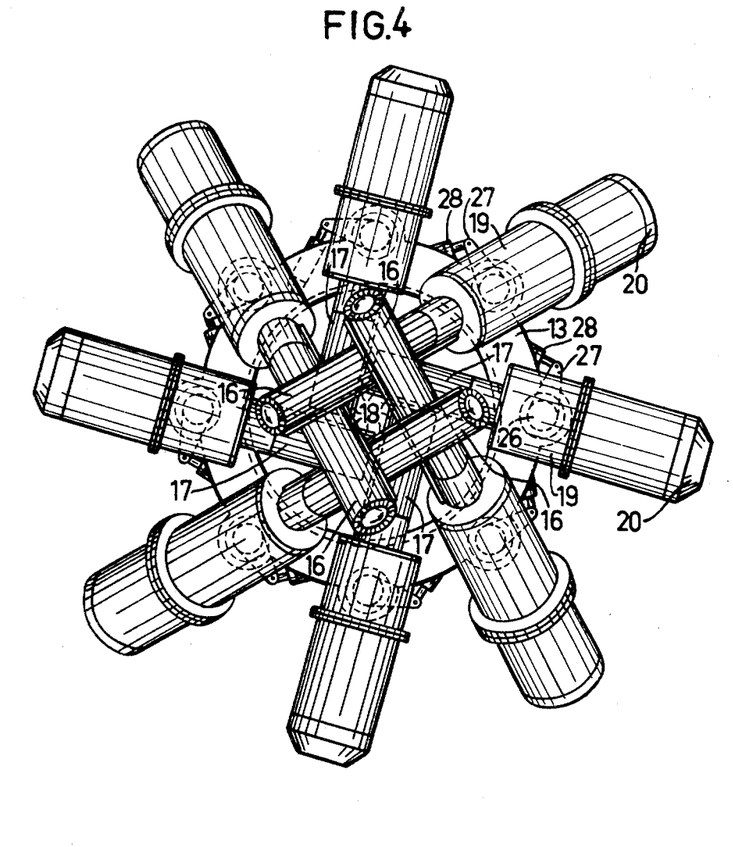

From FIGS. 2–4 it is seen how one type of branch removing tools are constructed and how they are arranged on the holder 13. The branch removing tools according to these figures consist of four outer cylindrical cutters 16, adapted to rotate in the direction of the arrows in FIGS. 2–4, and of four inner cutters 17. When the cutters 16 and 17 are hit by a branch they will be pressed against the surface of the tree by the force of reaction arising from the treatment of the tree. In order to avoid losses of wood because of said tendency of the cutters to eat themselves down into the surface of the tree the cutters are guided by adjustable feelers 18, which are constructed in such a manner and located behind the cutters in such a manner that they do not prevent the cutters from working the branches of the tree. The outer cutters 16 have such dimensions and are swingably mounted on the holder 13 in such a manner that no branches of the tree will be able to pass through the opening formed by the cutters 16 without being hit by any portion of the cutters. In FIGS. 2–4 there are shown four outer cutters 16 provided on the holder 13.

The tree, by means of a crane, a tractor, a conveyor or the like (not shown), is inserted between the cutters 16, 17, which at the end of the treatment are opened manually or automatically, said cutters being manually, or by means of mechanical, hydraulic, pneumatic or electric means (not shown), caused to work the tree. In an embodiment (not shown) of the branch removing machine the feed rolls 14, 15 have been omitted. In that case the tree is fed so far into the machine by the tractor that it will protrude through the opening in the holder 13 after which the tractor releases its hold of the tree. After that the tractor is driven forward so far that it will be able to grasp the end of the tree protruding from the opening in the holder 13, after which the feeding operation can be continued. If the machine is provided with feed rolls 14, 15 it is suitable to cause the cutters 16, 17 to work the tree through an impulse from the feed rolls 14, 15 only when said rolls have entered into engagement with the end of the tree.

During the working operation the outer cutters 16 may rotate in one direction and the inner cutters 17 counter thereto. Also, one or more of the outer or inner cutters 16, 17 may rotate counter to the rest of the cutters. In FIG. 2 the cutters 16 are rotated in that direction which is ordinary in connection with cutting operations. With the positions of the cutters 16, shown in FIG. 2, the cutters tend to twist the tree in the direction of the arrow. This twisting movement is taken up by the feed rolls. In the embodiment according to FIG. 1 this is effected by a suitable positioning of the shaft carrying that arm which carries the roll 15. During the working operation it is suitable to have the tangential points of the cutters 16, 17 on the tree positioned in a plane which is perpendicular to the direction of feed of the tree. Hereby the formation of such moments is prevented as would tend to bend the tree around an axis perpendicular to the longitudinal axis of the tree. During the working operation neither the tree nor the holder 13, including the cutters 16, 17 fixed thereto, will normally perform any twisting or rotary movement around the direction of feed of the tree. If the tree also is to be barked by the cutters, the feelers 18 are re-set in such a manner that each cutter 16, 17 will bark the tree in a stripe extending along the tree. If the number of cutters is to be reduced, or if barking is to take place around the whole circumference of the tree, then the holder may, by means of a device not shown, be caused to oscillate in the direction of the arrows according to FIG. 3.

Figure 5:
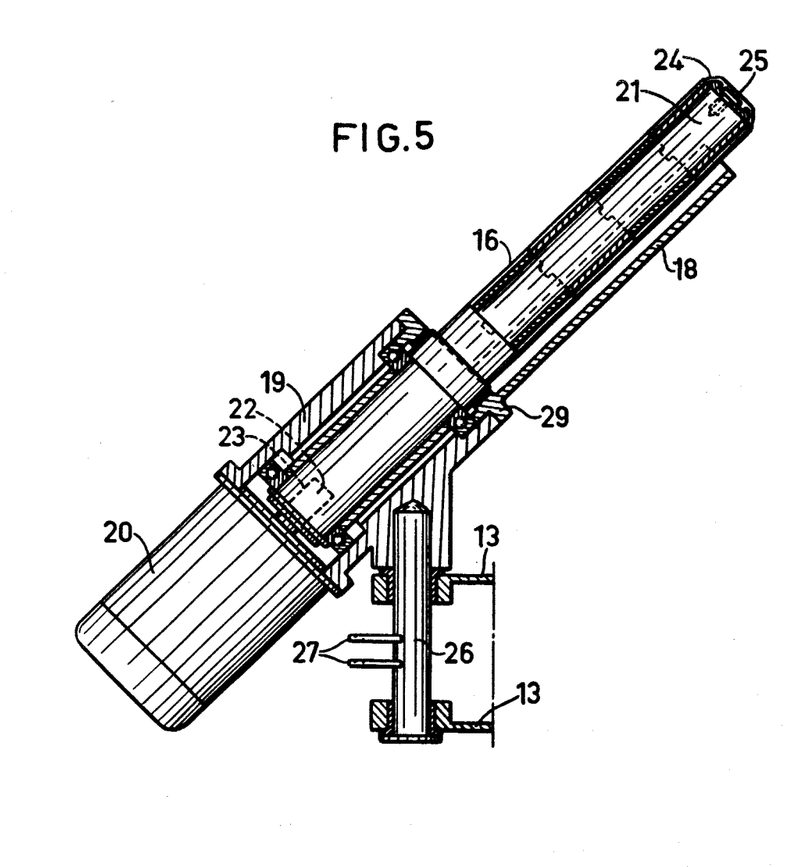
FIG. 5 shows a partial longitudinal cross section of an outer branch removing tool, consisting of a cutter, provided with a feeler for feeling the position of the envelope surface of the tree.

FIG. 5 shows, partly in section, in what manner a cutter 16 is mounted on the holder 13. Each cutter 16 is mounted in a sleeve 19. The diameter of the cross sectional area of the cutter may substantially equal to, or be less than, the diameter of the cross sectional area of the shaft carrying the cutter. The cutter 16 is driven by an electric motor 20, the shaft of which is coaxial with the shaft 21 of the cutter 16. Between the shaft 22 of the motor 20, the end of said shaft being square, and a square hole 23 in the shaft 21 of the cutter there are provided four members of rubber, (not shown) each having triangular cross section and each having both a coupling function and a safety function. Onto the shaft 21 there are threaded a number of exchangeable cutting elements of equal size, which lock each other. All cutting elements are held together by a frusto-conical nut 24 and a screw 25 extending through the center of said cutter, said screw 25 being secured in a threaded hole in the end of the shaft 21. The sleeve 19 is secured to a pin 26, which is swingably mounted on the holder 13. To the pin 26 there are fixed two arms 27, which are provided with holes, said arms being actuatable by a hydraulic, or a pneumatic, motor 28 (FIG. 4), supported by the holder 13. In an embodiment (not shown) of the machine the lines to the motors 28, which control the oscillatory movements of the cutters 16, 17, are connected in such a manner that the feelers 18 of the cutters 16 and/or 17 automatically center the tree in the branch removing machine.

The angle between the center lines of the shaft 21 of the cutter 16 and the pin 26 is chosen to be 20–70°, preferably 45°. The angle of a cutter 16 is chosen to be 20–70°, inter alia, for the reason that the branches shall not hit the sleeve 19 and the motor 20 before being hit by the cutters 16 in which case the feeding of the tree would be obstructed. If the angle of each cutter 16 is chosen to be less than 45°, the minimum opening, formed by the cutters 16, will be too large, which means difficulties in removing branches from trees having small diameters. If the angle of each cutter 16 is chosen to be more than 45° then, on the other hand, the cutters 16 will be unnecessarily long. In respect of the cutters 17 this angle is chosen to be 70–110°, preferably 90°. In an embodiment (not shown) of the machine, the cutters 16 have been omitted. In that embodiment at least three cutters 17, the angle of which is 70–110°, preferably 90°, are arranged in such a manner that those of the contours of the cutters 17 which confine the opening through which the tree is to pass, form at every moment of the working operation, a closed polygon in a plane which is perpendicular to the direction of feed of the tree. In the embodiment in question the cutters 17 are arranged in pairs, or one by one, in planes separated from each other and extending perpendicularly to the direction of feed of the tree, and the shafts 22 of the motors 20 are located at an angle to the center line of the cutter 17.

Figure 6:
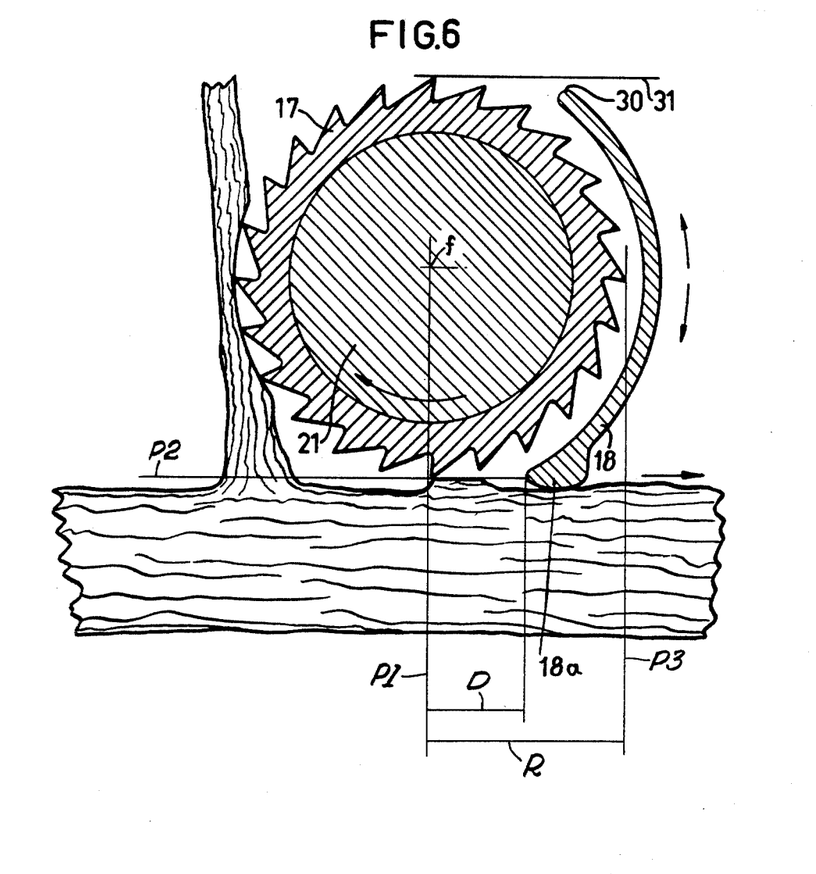
FIG. 6 shows an inner cutter, when in operation.

FIG. 6 illustrates the mode of operation of a cutter 17. The working depth is controlled by an adjustable feeler 18, the construction of which appears from, inter alia, FIGS. 5 and 1. According to FIG. 5 the feeler 18 is fixed to an annulus 29, which is adapted to be turned and which can be locked relative to the sleeve 19. There is one feeler 18 extending along each cutter 16, 17. According to what appears from FIG. 6 the dimensions of the feeler 18 are such and the feeler is turnable in such a manner that its edge 18a extends parallel with the axis of rotation $f$ of the tool and is adapted to feel the position of the envelope surface of the tree trunk, the distance D between said edge portion and a first plane P1 containing the axis of rotation of the tool and perpendicular to a second plane P2 parallel with said axis and extending in the longitudinal direction of the tree trunk is considerably less than the radius R of the envelope of said tool as measured between plane P1 and a plane P3 parallel thereto and passing in contact with the exterior of said envelope. Of course, the feeler 18 can be replaced by any mechanical, hydraulic, pneumatic, optic or electric member, which at, or after, the place of working feels the position of the envelope surface of the tree. If it is not possible to connect this feeling member, mechanically, in such a manner that it will directly control the oscillating movements of the cutters 16, 17, the member in question may be caused to control the movements of the hydraulic or pneumatic motor 28 in such a manner that the cutters 16, 17 always keep the desired working depth.

Figures 7, 8:
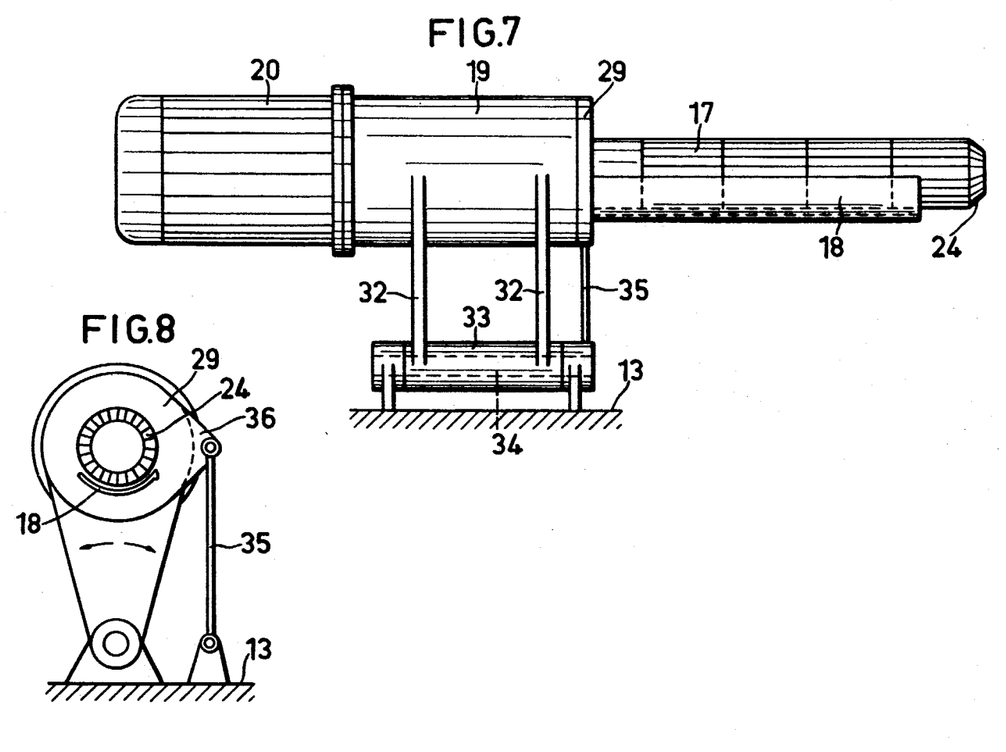
FIGS. 7 and 8 show an alternatively swingable embodiment of an inner cutter and automatic adjusting means for the feeler of said inner cutter.

FIG. 7 shows a swingable arrangement of the fastening means of an inner cutter 17. The sleeve 19 is supported by two arms 32 of equal length. In connection with an outer cutter 17 such arms are of unequal length. The arms 32 are fixed to a sleeve 33, which is supported by a shaft 34 supported by the holder 13. On opening and closing the cutters 16 and 17 and during the working operation the cutters are swung in the manner shown by the arrows in FIG. 8. The position of the feeler 18 is changed automatically in accordance with the swinging position of the cutter 16, 17 by means of a link member 35 fixed to the holder 13, said link member 35 being secured to a lug 36 on the annulus 29 of the feeler 18.

Figure 9:
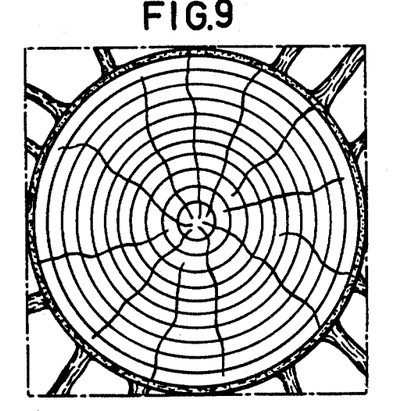
FIGS. 9 and 10 show cross sectional views of a tree after having been subjected to treatment with, respectively, four cutters and eight cutters.
Figure 10:
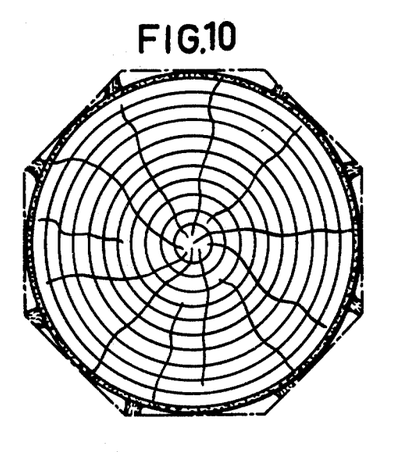
Figure 11:
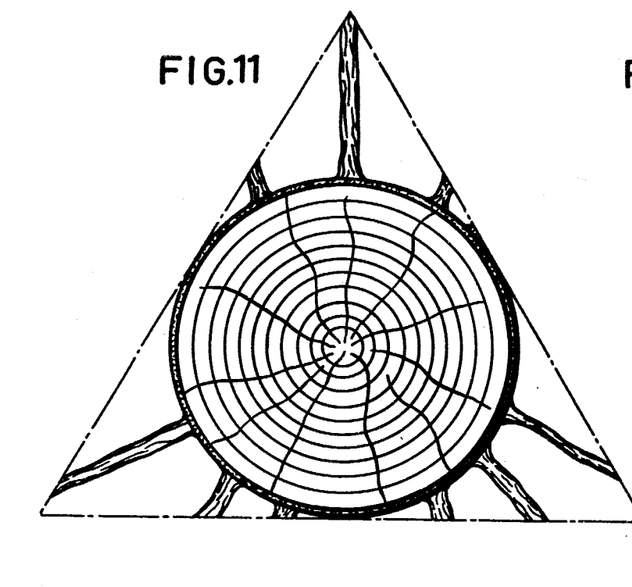
FIGS. 11, 12 and 13 show cross sectional views of a tree after having been subjected to treatment with, respectively, three, six and twelve cutters.
Figure 12:
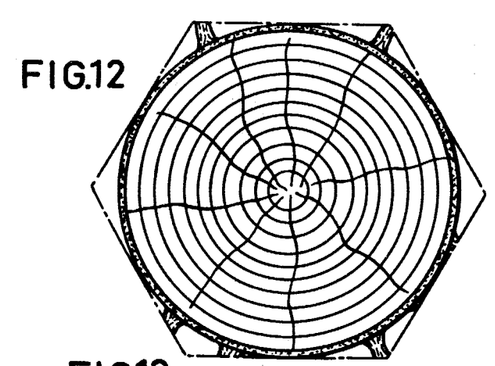
Figure 13:
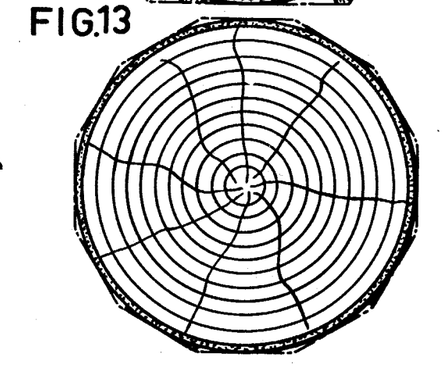

In FIG. 9 there is shown the appearance of a tree after it has passed the outer cutters 16, and in FIG. 10 there is shown the appearance of the same tree after it has also passed the inner cutters 17. Practical tests have shown that the remaining branch stumps do not form any obstacles in connection with the transportation of the tree or in connection with a subsequent working, if any, in a barking machine. In a simplified embodiment of the branch removing machine the number of the outer and inner cutters 16, 17 has been reduced to three of each kind. FIGS. 11 and 12 show the result of a working operation, using the three outer cutters, and respectively all of the six cutters. In case a very smooth surface of the tree is desired the machine may be provided with twelve cutters. FIG. 13 shows the result of a working operation carried out with twelve cutters.

We claim:

1. In a branch removing machine including a frame, substantially cylindrical, rotatable, branch removing tools journalled in bearing housings supported from the frame, said tools being movable towards and away from a tree trunk, said tools being arranged in such manner that a space is formed therebetween for the passage of such tree trunk, and means for rotating said tools, the improvement wherein the working depth of each tool is controlled by a feeler supported from the appertaining bearing housing each feeler comprising an edge portion extending parallel with the axis of rotation of said tool and adapted to feel the position of the envelope surface of the trunk, the distance between said edge portion and a first plane containing the axis of rotation of the tool and perpendicular to a second plane parallel with said axis and extending in the longitudinal direction of the trunk being considerably less than the radius of the envelope of said tool.

2. A branch removing machine according to claim 1 the distance between the edge portion of the feeler and said first plane being approximately half the radius of the envelope of said tool.

3. A branch removing machine according to claim 1 said feeler being arranged to be turnable around the axis of rotation of the tool and lockable in any adjusted position relatively to said bearing housing.

4. A branch removing machine according to claim 1 said edge portion of the feeler being blunt-shaped as seen in cross section in order that the feeler may easily slide over uneven portions of the trunk surface.

References Cited

UNITED STATES PATENTS

| 3,326,251 | 6/1967 | Herolf et al. | 144—2 |
| 1,438,904 | 12/1922 | Crouse et al. | 144—208 |

FRANCIS S. HUSAR, Primary Examiner

U.S. Cl. X.R.

144—208